(12) United States Patent
Maximilien et al.

(10) Patent No.: US 8,464,351 B2
(45) Date of Patent: Jun. 11, 2013

(54) SECURITY APPARATUS (75) Inventors: Benoît Maximilien, Le Chesnay (FR);
Laurent Frerebeau, Colombes (FR);
Eric Weber, Colombes (FR);
Jean-Marc Lacroix, Colombes (FR)

(73) Assignee: Thales, Neuilly sur Seine (FR)

( * ) Notice: Subject to any disclaimer, the term of this patent is extended or adjusted under 35 U.S.C. 154(b) by 96 days.

(21) Appl. No.: 13/132,618

(22) PCT Filed: Dec. 2, 2009

(86) PCT No.: PCT/EP2009/066256
§ 371 (c)(1),
(2), (4) Date: Jul. 29, 2011

(87) PCT Pub. No.: WO2010/063768
PCT Pub. Date: Jun. 10, 2010

(65) Prior Publication Data
US 2012/0036581 A1    Feb. 9, 2012

(30) Foreign Application Priority Data
Dec. 5, 2008    (FR) ...................................... 08 06839

(51) Int. Cl.
*G06F 17/00* (2006.01)
(52) U.S. Cl.
USPC .............................................. 726/26; 726/11
(58) Field of Classification Search
USPC ......................................................... 726/26
See application file for complete search history.

(56) References Cited

U.S. PATENT DOCUMENTS

| 7,428,754 | B2 * | 9/2008 | Neumann et al. ................ 726/15 |
| 7,490,347 | B1 * | 2/2009 | Schneider et al. ................. 726/2 |
| 7,970,947 | B1 * | 6/2011 | Frank et al. ..................... 709/249 |
| 8,185,947 | B2 * | 5/2012 | Kurapati et al. ................. 726/15 |
| 2003/0065676 | A1 | 4/2003 | Gbadegesin et al. |
| 2010/0132011 | A1 * | 5/2010 | Morris et al. ...................... 726/1 |

FOREIGN PATENT DOCUMENTS

| EP | 1480124 A2 | 11/2004 |
| WO | 2007/106565 A2 | 9/2007 |
| WO | 2008/108868 A1 | 9/2008 |

* cited by examiner

*Primary Examiner* — Matthew Smithers
(74) *Attorney, Agent, or Firm* — Baker Hostetler LLP (57) ABSTRACT

A security apparatus positioned between at least one domain having a level of trust or of sensitivity A and at least one domain having a level of trust or sensitivity B, bearing in mind that the level A is different from the level B, comprises a virtualization software layer V implemented on the physical layer H and positioned between said physical layer H and at least one set consisting of at least three different compartmentalized blocks having different sensitivity levels, BLA, BLB, MDS. The compartmentalized blocks rest on the physical layer H and the virtualization layer and the blocks include at least one of: a network block A, BLA, comprising all the network functions used to process data of security level A, a network block B, BLB, comprising all the network functions used to process data of security level B, and a security module software block, MDS, or airlock positioned between at least one block of BLA type and at least one block of BLB type, said security module being designed to monitor the exchanges of data between said blocks BLA and BLB, said security module comprising all the security, filtering or cryptographic function transformations.

10 Claims, 10 Drawing Sheets

SECURITY APPARATUS

CROSS-REFERENCE TO RELATED APPLICATIONS

This application is a National Stage of International patent application PCT/EP2009/066256, filed on Dec. 2, 2009, which claims priority to foreign French patent application No. FR 08 06839, filed on Dec. 5, 2008, the disclosures of which are incorporated herein by reference in their entirety.

FIELD OF THE INVENTION

The invention relates to the field of the security of information systems. It relates to the design of security apparatus, taking into account their specific constraints (type and quality of insulation, flow control, etc.) by means of a virtualization layer. The system according to the invention is intended to be positioned between domains that have mutually different sensitivity levels.

The invention applies, for example, to the partitioning of sensitive processing operations, to flow control for data exchanged between domains of different security levels, and to the restriction of access to sensitive resources such as a cryptographic component, a communication means, a storage device, etc.

BACKGROUND OF THE INVENTION

The design of secure equipment requires information of different sensitivity levels to be segregated and the ability of such information to be mixed or modified, or its processing to be disturbed, to be avoided.

Such information may be private or public, red or black, sensitive or shared, uncoded or encrypted.

Segregating such data requires a segregation of the processing operations that manipulate them, and of the storage spaces (persistent, volatile, temporary, etc.) that contain them. The task is difficult if it is considered that the means used to support these processing operations (processors, memories, etc.) are physical systems which 1) have edge effects on their environment (electromagnetic radiation, electrical consumption, etc.), 2) have intrinsic characteristics (memory caches, processing prediction elements, etc.) likely to hold sensitive information between two processing operations and, 3) use materials that may exhibit a certain remanence of the information after power down.

In the field of security, the prior art proposes technical solutions based on hardware segregation principles, or software solutions with low resistance to intrusion attempts (and therefore, with low security level). The current solutions, such as the red-black hardware architectures, known to those skilled in the art, are costly to develop and produce. They require the design and the evaluation of a number of hardware cards and, usually, a complex software environment for synchronizing the exchanges between cards, segregating the administration functions, etc. These solutions lack flexibility because they are hardware solutions, necessarily less easy to correct/update in case of correction of computer anomalies (better known by the term "bug").

A number of manufacturers and laboratories are currently working on virtualization technologies and, more particularly, on their specific security issues. Today they are widely used by server managers and more anecdotally on workstations, generally for software development and debugging purposes. They are as yet little used for security requirements.

The patent application WO 2008/108868 discloses a system and a method for implementing a virtual security platform. This patent aims to create logic compartments on a server to associate each of them with a communication network or a subnetwork, with the aim of segregating the processing operations and the specific data from these networks. This patent addresses a network issue, and more specifically an issue of segregation of the addressing and routing spaces.

The use of a virtualization technology does not however make it possible in itself to resolve one or more of the above-mentioned problems. It may, however, make it possible to make systematic the taking into account of physical means or specific security procedures, and to facilitate the security evaluation of a sensitive equipment item: the taking into account of the security constraints of an equipment item is related no longer to the operating system (or OS), potentially large and complex, and the applications manipulating sensitive data, but to the virtualization technology responsible for driving the hardware resources, for restricting access to the latter and for applying a strong partitioning (logical and, possibly, physical) between the various processing operations and the information streams. Ultimately, by using a virtualization technology, the issue for a designer of a sensitive equipment item becomes an issue of the secure design of "low level" and small size software, and no longer the securing of a huge amalgam of code lines. For information, virtualization is a software layer situated between the hardware and the operating system and the client application. It makes it possible to compartmentalize the application with an OS in mutually logically independent blocks; in other words, the virtualization makes it possible to produce a "leak-tight" or controlled partitioning between the compartments and ensure that only the authorized flows can intervene between the blocks. The virtualization technology was initially devised to pool and allow an equitable and transparent sharing of hardware resources (processors, storage and communication means resources, etc.) that are a priori costly and underused. This so-called "virtualization" technology enables a number of software environments dedicated to different uses or users to share the same hardware resources, while giving each the impression of these environments being the only ones to benefit from the resources of the accommodating platform. In that, the virtualization technologies are differentiated from the operating systems: a multitasking OS enables a number of applications to run simultaneously on the same hardware platform, without seeking to give them the impression that they are the only users of the platform.

SUMMARY OF THE INVENTION

The present innovation aims to describe a trusted compartmentalized architecture which makes it possible to partition, exchange, process and filter information, possibly (and not only) linked to communication networks, by means of a technology: virtualization. The equipment that implements this novel architecture makes it possible to segregate, dissociate information of different sensitivity levels because the information belongs to independent domains.

The subject of the present invention relates to a security apparatus ES arranged to be positioned between at least a first domain having a first sensitivity level A and at least a second domain having a second sensitivity level B, bearing in mind that the security level A is different from the security level B, characterized in that it comprises at least the following elements:

a physical layer H and interfaces I allowing for the exchange of data between said security apparatus and the various domains A, B, a virtualization technology V implemented on the physical layer H and positioned between said physical layer H and at least a set consisting of at least three compartmentalized blocks, BLA, BLB, MDS, said compartmentalized blocks resting on the physical layer H and the virtualization layer and said blocks consisting of at least one of the elements taken from the following list:

a network block A, BLA, comprising all the network functions used to process data of security level A, a network block B, BLB, comprising all the network functions used to process data of security level B, a security module software block, MDS, or airlock positioned between at least one block of BLA type and at least one block of BLB type, said security module being designed to monitor the exchanges of data between said blocks BLA and BLB, said security module comprising all the security, filtering or cryptographic function transformations.

The letters A and B are used as a generic reference to designate domains that have different security levels. The expression "at least one second domain of security level B" may designate a second domain of security level B, and a third domain with a security level C different from B and A different from C.

A security apparatus ES comprises, for example, functions suitable for managing the exchange of the data flows between the various blocks as follows:

the exchanges between the domain A and the software block BLA, the exchanges between the software block BLA and a security module MDS, the exchanges between a security module MDS and the software block BLB, the exchanges between the software block BLB and the domain B.

Thus, the direct exchanges between the domain A and the domain B are prohibited. The direct exchanges between the blocks BLA and BLB are prohibited in normal operation of said security apparatus.

Each of the domains A, B is linked to a subnetwork or a network LANi, WANi, said software blocks BLA and BLB being, in this exemplary application, network blocks BRA, BRB.

A security module MDS includes, for example, one or more of the functionalities chosen from one of the following: an IP encryptor or similar and/or a firewall and/or a diode and/or intrusion detection and/or flow analysis. The MDS module is in fact an obligatory control point for all the flows that transit between the domain A and the domain B.

The security apparatus according to the invention may comprise a number x of security blocks A, a number of security modules equal to x, a number y of security blocks of level B, with A different from B.

The security module MDS is positioned so that the path taken by the data flows in a security apparatus ES is as follows: the flow FI initially comprising uncoded sensitive data is an outgoing flow leaving the domain B toward the domain A, it passes through the physical layer H and the virtualization layer V, before transiting via the red network block, is then transmitted to the cryptography security block for the outgoing flows, the encrypted data are then transmitted to the black network block before being transmitted to the domain A and in that a flow FII leaves the domain A and is transmitted via the physical layer H and the virtualization layer V into the red block, then transmitted to the security block or airlock in which the data are decrypted.

The apparatus may include an administrator module for the operation of said security apparatus.

The number of security module blocks MDS is equal to the number of security levels or to the number of security level blocks present in said security apparatus.

The number of security levels is equal to the number of red block levels.

The invention targets a security apparatus and its use. It notably offers the following advantages:

1) reduced cost of production of the sensitive equipment, 2) easier evaluation (example: Common Criteria Certification EAL), 3) greater flexibility in the management of any design or implementation bugs.

The secure apparatus according to the invention also makes it possible:

to segregate the software environments that have different trust levels, by the origin of the constituent source code and by the number and the nature of the tests used to qualify these compartments, for example, to restrict access to the sensitive resources (and notably to the cryptographic resources) to only those compartments that actually need them, to apply a security policy that includes access control rules, independently of the nature and of the structure of the compartments supported and therefore independently of the operating systems.

BRIEF DESCRIPTION OF THE DRAWINGS

The invention will be better understood, and other advantages will become apparent from reading the detailed description, given as a nonlimiting example, and using the figures in which:

FIG. 1 represents an architecture diagram of a secure apparatus according to the invention, FIG. 2, an architecture in the case of an apparatus comprising several security levels, FIGS. 3A and 3B, a security apparatus incorporated in a standard client station with a single security level and a multilevel apparatus, FIGS. 4A and 4B, two exemplary security apparatuses used for transit, FIG. 5, the path taken by the data flows in the case of a system as described in FIG. 1, FIG. 6, the diagram of the path taken by flows in the case of a multilevel security apparatus, FIGS. 7A and 7B, an exemplary implementation of the security apparatus in a cryptographic equipment item, FIG. 8, an exemplary concrete implementation, FIG. 9, an example of the details of the mechanisms for ensuring the execution of the security transformation, FIG. 10, an example of spatial protection, implemented in the system in accordance with the invention, FIG. 11, another example specifying the gateways that can be used, FIG. 12, an example of temporal protection, FIG. 13, an example of a system according to the invention used as a gateway, FIG. 14, an exemplary security apparatus which contains two security modules in which the same processing operations are run in parallel with a slight time offset, and FIG. 15, an exemplary security apparatus which contains three security modules with a majority voting mechanism.

DETAILED DESCRIPTION

The examples given hereinafter in the description relate to network blocks. Without departing from the context of the invention, the network blocks could be replaced with software blocks denoted BLs, the latter possibly being suitable for managing a human-machine interface, hard disks or even network functions.

Figure 1:
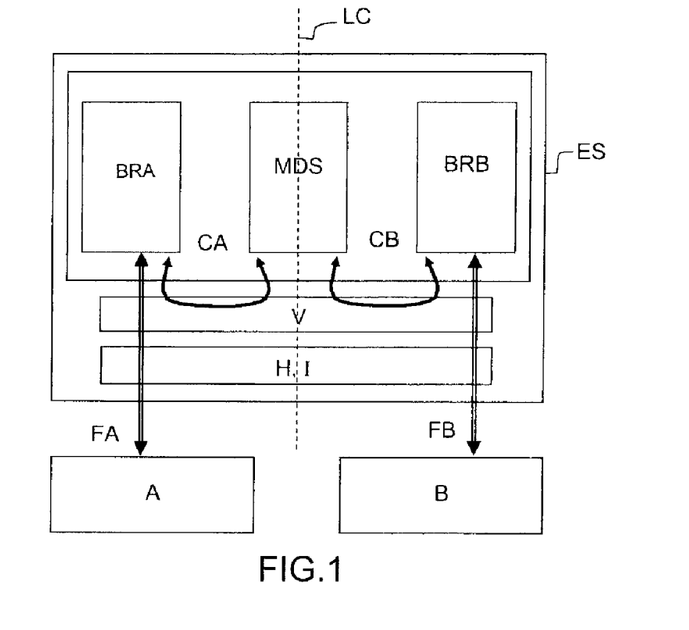

FIG. 1 represents an exemplary security apparatus ES consisting of a set of compartmentalized blocks each comprising an independent application with its operating system. FIG. 1 shows a first network block BRA of security level A, a second network module BRB of security level B, a security module MDS that has, for example, a data encryption function or any other function suitable for controlling, filtering, or otherwise processing the data. The security module or airlock is a security airlock which prevents any direct data communication between two different security levels; it is positioned to intersect one or more flows and it applies security processing operations (inspection, depollution, access control, encryption, labeling, attribution, etc.) to each of these flows by using, if necessary, security resources (storage element, cryptographic component, trust interface, etc.) whose access is reserved to it; its relative complexity, and the possibility of being able to upgrade its content (to add or eliminate functionalities, for example), justifies why it is segregated from the underlying virtualization technology, targeted more on the pooling and controlling of access to the hardware resources; its security role, and the need for a security evaluation according to high assurance criteria justify why it is segregated from the software blocks to which it offers its services (BRA and BRB in the case of FIG. 1). Thus, in the figure, the set consisting of the three compartmentalized blocks BRA, BRB and MDS) are implemented on a virtualization software layer V, this layer being implemented on physical hardware, better known by the abbreviation hardware, and the interfaces I allowing each of the blocks to communicate with the outside, for example the network A and the network B in FIG. 1.

The circulation of the data flows between the various blocks BRA, BRB is conducted as follows. The block BRA exchanges data or information via the virtualization software layer V and the physical layer H toward an external network A which corresponds to a domain with a security level that is different from B, by means of a link or along a path, FA. The same block BRA communicates with the security module MDS via a link CA. This block BRA never communicates directly with the block BRB in the case of normal operation of the security apparatus. The data exchanges are always filtered or controlled by the security airlock.

The block BRB exchanges data with an external network B of security level B different from A via the virtualization software layer and the physical layer and via a link FB. This same block BRB exchanges data with the security block MDS via a link CB. In the case of normal operation, the block BRB has no direct exchanges with the block BRA.

Each block or compartment which is situated above the virtualization layer consists, for example, of an operating system or OS, or specific "OS" (optional), and its client application (user program). Each compartment is obviously functionally independent of the others (such is the aim of the virtualization): in other words, it is possible to execute, stop or reboot in each of the compartments the programs that are running therein.

The proposed solution thus provides an essentially software solution which guarantees a high security level, in order to obviate the obligation to always propose a solution produced using compartmentalized physical elements, which is these days costly and technologically limited. The use of the virtualization layer is positioned between the hardware layer and the software compartments consisting of an operating system and the user application. Thus, the invention makes it possible to design sensitive apparatus such as IP encryptors, highway encryptors in communication networks, firewalls or even cryptographic resources for example, at lower cost and with a comparable security new (provided that the virtualization technology and the underlying hardware have certain essential properties) compared to a purely hardware solution.

Thus, the virtualization technology V is the obligatory point of passage for any exchange between a software component and a sensitive resource on the one hand, and between two software components on the other hand. It ensures control:

1) of the flows between software components and hardware resources by pooling the resources of the physical layer between a number of software components and by controlling access to these resources (example: cryptographic component), and 2) flows between software components. It allows communication between at least two software components (or blocks).

In other words, this virtualization technology (layer V) applies:

on the one hand, a spatial and temporal policy of isolation of the software components that are associated with it, and on the other hand, a security policy (authentication, access control, data rate restriction, restriction of flow orientations, attribution, etc.).

Consequently, the security policy applied by the virtualization technology makes it possible to reserve the access to certain hardware resources to one or more implementations of a component (hardware or software) of a particular type, called "security airlock" or "security module (MDS)" which contains the security functions which are more often than not complex, specific and critical.

Figure 2:
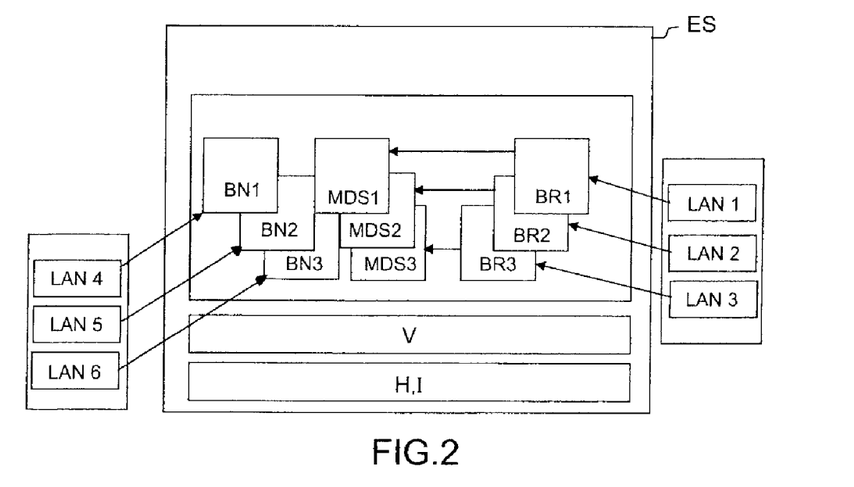

FIG. 2 schematically represents a security apparatus architecture according to FIG. 1, comprising a number of security levels. In this example, the description concerns red network blocks BRi of security level A which each individually constitute an interface with the sensitive domain to which they are dedicated (for example, a local area network or private LAN, LAN1, LAN2, LAN3); the data are sensitive and generally circulate uncoded. It also concerns so-called black network block BNi, which forms the interface with the public domain (for example, a wide area network or WAN); the data are either encrypted or unprotected. However, it is possible to imagine that there are a number of black domains BN1, BN2, BN3 connected to a number of LANs, LAN4, LAN5, LANG with lower sensitivities than the red domains. The function of the blocks MDS1, MDS2, MDS3 (or security block) is notably to filter, analyze the only flows allowed to circulate, possibly after having subjected them to a cryptographic processing operation, a depollution, a desensitization, terms commonly used by those skilled in the art in the field of security. More specifically, a red network block BRi will communicate data via a security airlock MDSi to a block BNj (or vice versa, but always via an MDS).

The example of FIG. 2 contains the virtualization layers and the physical layer of FIG. 1. The number of red blocks, which can have different security levels, BR1, BR2, etc, is at least greater than or equal to the number of airlock blocks or security blocks (MDS1, MDS2, MDS3, etc. for example). On the side of the black blocks, there may be one or more security levels.

The virtualization is adapted to multilevel use:
Red side: the apparatus can process a number of flows of different security levels connected to a number of different local area networks, or LANi. In this case, a red level is associated with an airlock block MDS1.
On the black side, it is usual for the black block BNi to be connected to a single sensitivity domain (such as a wide area network or a public network, in certain contexts). There may be even a single black level or else a number of black levels, not necessarily in the public domain.

In this example, 6 local area networks, better known by the acronym "LANs", are represented. They are connected to the sensitive apparatus through an Ethernet port. It is interesting to note that the LANs represent different sensitivity levels or different trust levels (that is to say, identical sensitivity levels but with information of different natures: for example, information of the same "secret" levels but from a country A and from a country B which do not want to mix their flows, which implies a different trust level).

Figure 3A:
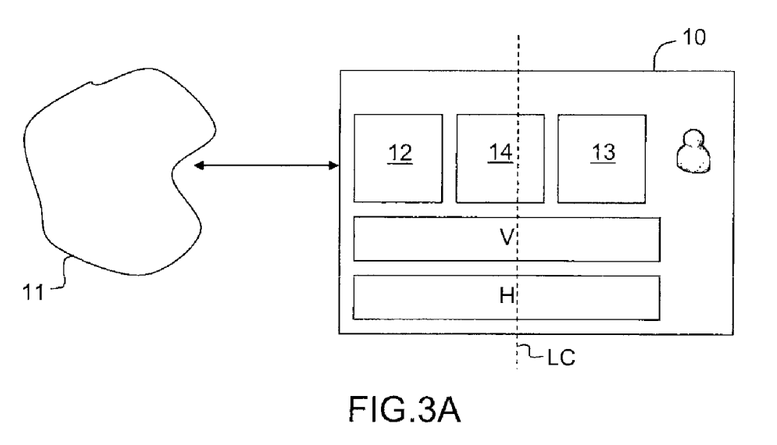
Figure 3B:
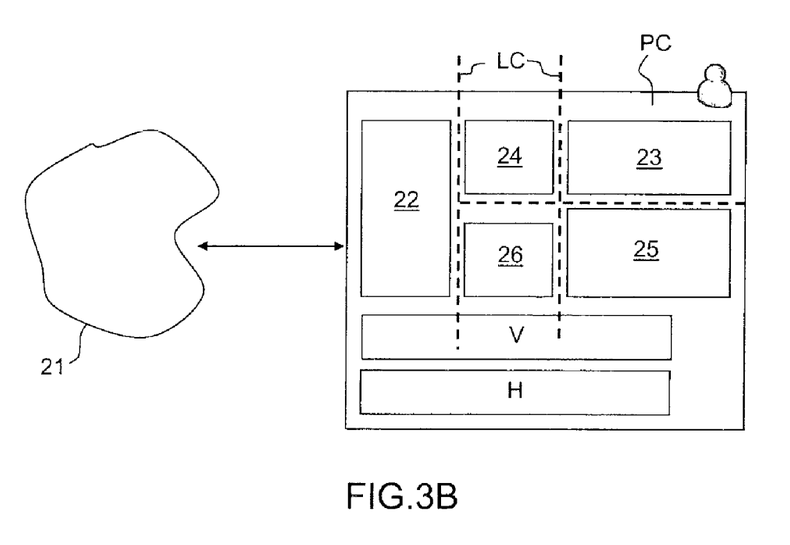

FIGS. 3A and 3B represent two examples of secure apparatus according to the invention having a terminal function, for example in a network application.

FIG. 3A shows an exemplary secure apparatus incorporated in a standard client station 10 which communicates with a network R. The client station which may be a user PC comprises a physical layer H, a virtualization layer V, a black network block 12, a human-machine interface block which constitutes the red block 13, and an airlock 14 segregating the two blocks 12, 13, black network block and red network block.

FIG. 3B represents an exemplary secure apparatus implemented in a multilevel client station. The client station 20 is connected to a network 21. The client station 20 comprises a physical hardware layer H, a virtualization layer V, a black network 22, a first human-machine interface (1st client of the server) having a sensitivity level NR1, 23, linked to a first airlock 24, a second human-machine interface 25 (2nd client of the server) having a second security level NR2 communicating with a second airlock 26. The dotted lines in FIG. 3B represent the software segregation of the various abovementioned modules. Thus, the second block 25 cannot communicate with the first block directly because they do not have the same sensitivity level. The airlocks do not communicate with one another.

The sensitive compartments are multiplied by the number of levels managed by the terminal.

The partitioning line LC shows the software and functional segregation of the network domains: in other words, information of different sensitivity levels is never mixed. This software segregation is as proven as a conventional hardware segregation.

Figure 4A:
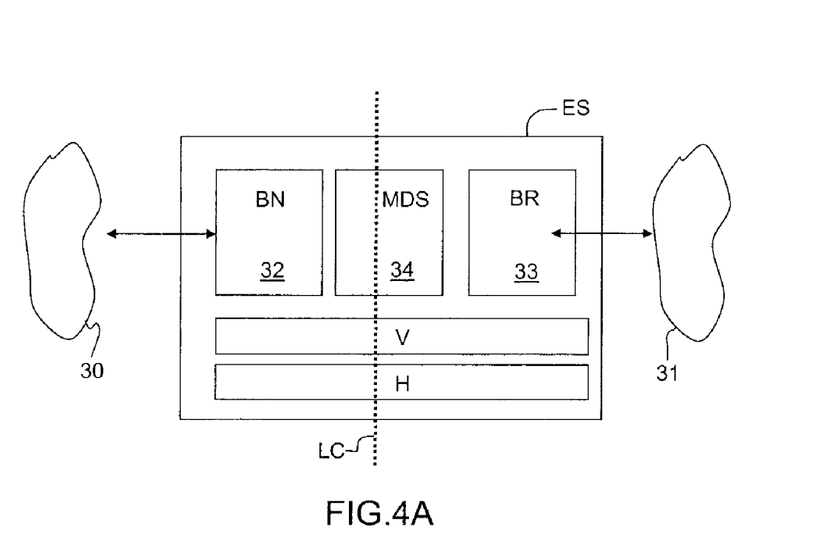

FIG. 4A schematically represents an exemplary security apparatus used as a gateway, or transit, between a first wide area network known by the acronym "WAN" 30 and a second local area network LAN, 31. The security apparatus consists of a black part 32, linked to the WAN 30, a red part 33, linked to the LAN 31, and an airlock 34 acting as partitioning line between the two networks of different sensitivity levels. The apparatus always comprises the physical layer H and the virtualization layer V. In this example, communications with the networks are conducted via the black or red parts. A partitioning line LC between two security levels is schematically represented in the figure: this partitioning line is not physical. However, it indicates that, logically and functionally, no data can pass from one domain to the other without passing through an airlock (or MDS: security module).

Figure 4B:
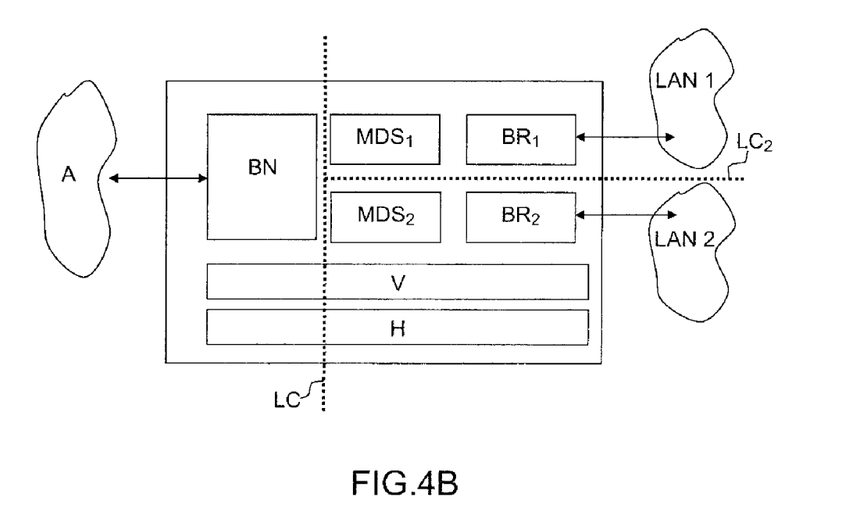

FIG. 4B represents an application of FIG. 4A for a red part comprising a number of security levels. In this case, each red block of security level NRi has a corresponding airlock part Si. The dotted lines in the figure represent the partitioning lines LC, LC2 between the duly formed networks which have different sensitivity levels.

FIG. 4B can be considered as a gateway or a firewall, or an encryptor, or a network diode, etc.

A black part or a red part consists of the following elements: an OS (Operating System), drivers, client applications which offer services (with libraries, possibly DLL (Dynamic Link Library), etc.). The applications may be diverse: an SNMP (Simple Network Management Protocol) agent, a spanning tree function, a flow coloring function, an IP (Internet Protocol) stack management function, a QoS (Quality of Service) management function, ARP (Address resolution protocol) function, transversal NAT (Network Address Translation) function, fragmentation function, DSCP (Differentiated Services Code Point) switching function, congestion management function, alarm and logging functions, DHCP (Dynamic Host Configuration Protocol) function, VLAN (Virtual Local Area Network) function, load balancing function, mobility (Mobike) function, routing function (RIP: Routing Information Protocol), OSPF (Open Shortest Path First), etc., to sum up, all the standard network functions.

In the security module part MDSi the following functions are notably implemented:
   filtering functions (port number filtering, protocol filtering, antivirus, IP filtering, IDS, etc.)
   or cryptographic or security functions (encryption, decryption, IPSEC protocol function known to those skilled in the art, anti-replay counter function, symmetrical key management function, certificate function, emergency erase processing function, anti-intrusion security function, etc.).

Figure 5:
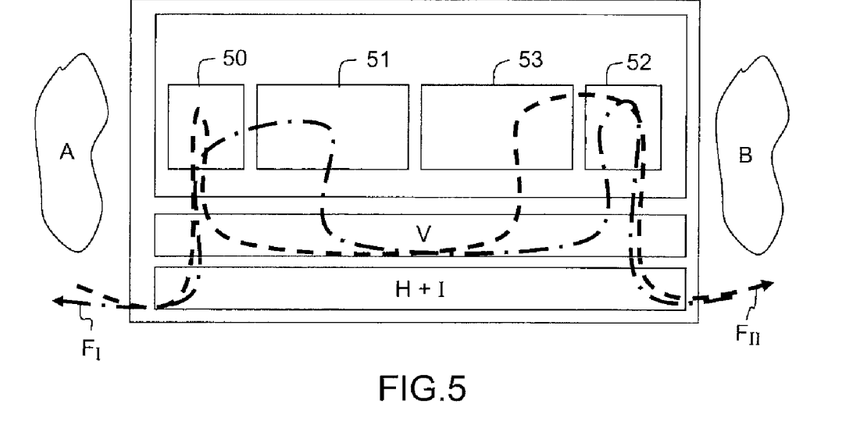

FIG. 5 schematically represents the path of the flow of data in a security apparatus such as that described in FIG. 1 or even in FIG. 4A. In this example, the security apparatus is an IP encryptor.

The flow FI initially comprising uncoded sensitive data is an outgoing flow leaving from the domain B toward the domain A. It passes through the physical layer H and the virtualization layer V, before transiting via the red network block 52, is then transmitted to the cryptography airlock block 51 for the outgoing flows, for example, this block may encrypt the data of the flow. The encrypted data are then transmitted to the black network block 50 before being transmitted to the domain A. The path of the incoming flows is as follows: the flow Fll leaves from the domain A and is transmitted via the physical layer H and the virtualization layer V into the red block 52, then transmitted to the airlock block 53 in which the data are, for example, decrypted. The decrypted data are then transmitted to the red block 52 before being sent to the domain B network.

The black block, like the red block, contains network functions known to those skilled in the art. The cryptography modules or security module (MDS) contain security functions or critical functions (such as encryption or decryption).

Figure 9A:
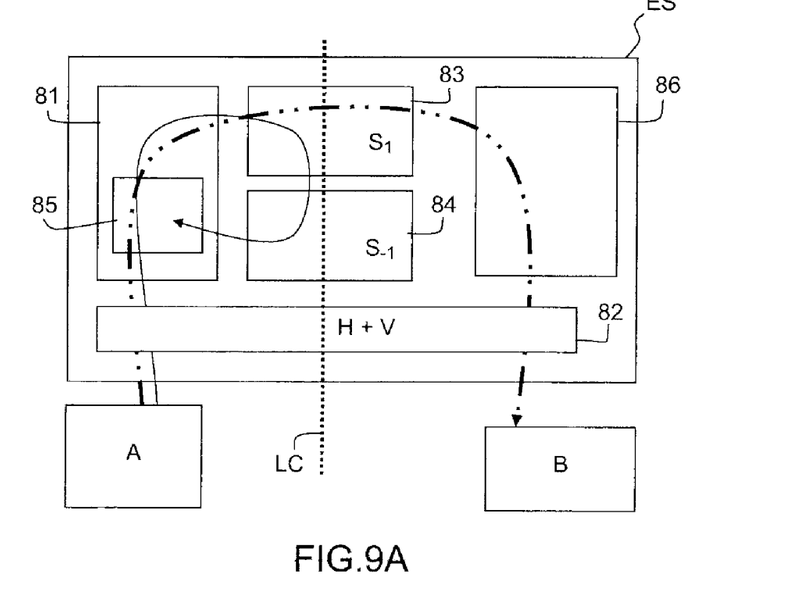

On each transition from one red or black block to the other, the flows pass through the virtualization layer V. The breakdown of the cryptographic modules in this exemplary application or MDS into two distinct parts (encryption/decryption) makes it possible to segregate the incoming flows from the outgoing flows. This has the advantage of improving security because each airlock becomes a diode dedicated to a one-way direction of data flow (the functions are dedicated) and also increase the dependability and allow for self-testing mechanisms (see FIG. 9 A).

Thus, each MDS is allocated to a given direction and each block BRi is dedicated to a particular routing according to the direction of the flow. The network block BRi switches the message either toward the outside (the LAN or WAN network to which it is connected) or to the correct security block MDS.

The network blocks BRi cannot communicate directly with one another. Since the security modules contain the critical security functions, the security policy, they handle the communications between the network blocks BRi.

Figure 6:
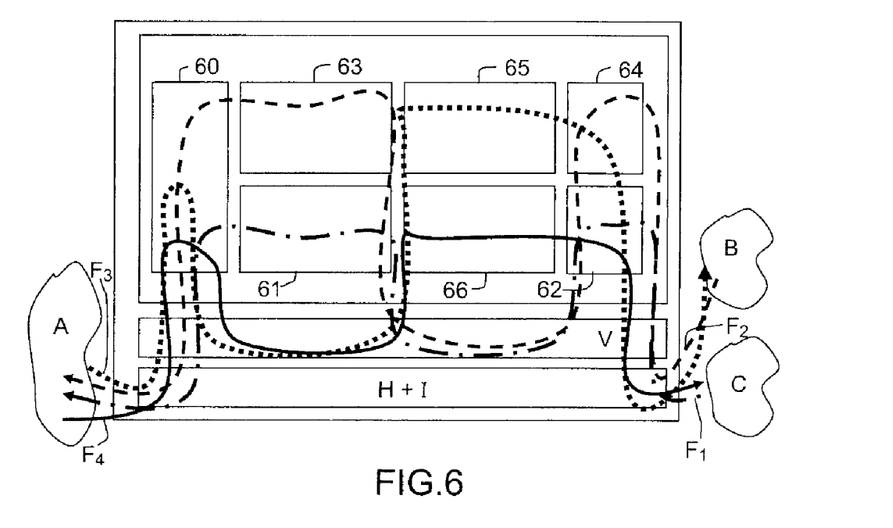

FIG. 6 represents the path taken by the data flows in a security apparatus with several different security levels as described in FIG. 4B, for example.

The path F1 represents a first outgoing flow leaving from the domain C toward the domain A. The flow F1 takes the following path; it passes through the hardware layers and the physical and virtualization interfaces to then pass into the red network block 62. After it is transmitted to a first airlock block 61 within which the data are, for example, encrypted. The encrypted data pass back through the virtualization layer V before passing through the black network block 60 then via the virtualization layer, these encrypted data are transmitted to the domain A network.

The line F2 represents the path of an outgoing data flow leaving from the domain B toward a domain A network. The data flows pass via the physical layer H and virtualization layer to the red network block 64. They are then transmitted to an airlock block 63 for encryption of the data before being transmitted via the virtualization layer to a black block 60. The encrypted data are then transmitted via the virtualization layer and the physical layer to the domain C.

The arrow F3 corresponds to the path taken by an incoming flow leaving from the domain A and going to the domain B. The data flow will be transmitted via the physical and virtualization layers to the black block 60, then into the airlock block 65 in order for the data to be decrypted, for example. The decrypted data may be transmitted via the virtualization layer and the physical layer to the red network block 64, then to the network B via the virtualization layer and the physical layer.

The arrow F4 schematically represents the path of an incoming flow leaving from the domain A to culminate at the domain C. The data of the flow are transmitted from the network A to the black network block 60 before being decrypted in the airlock block 66. The decrypted data are then transmitted via the virtualization layer and the physical layer to the red network block 62 before being sent to the domain C via the virtualization layer and the physical layer.

Each communication between two blocks authorized to communicate with one another mandatorily passes through the virtualization layer which guarantees the partitioning and the control of its exchanges between the blocks. The network blocks contain the standard network functions. They handle the interchanges between the outside and the MDSs. They cannot communicate with one another. The blocks MDS always have the security function described previously and handle the communication between the network blocks BRi exclusively.

Figure 7A:
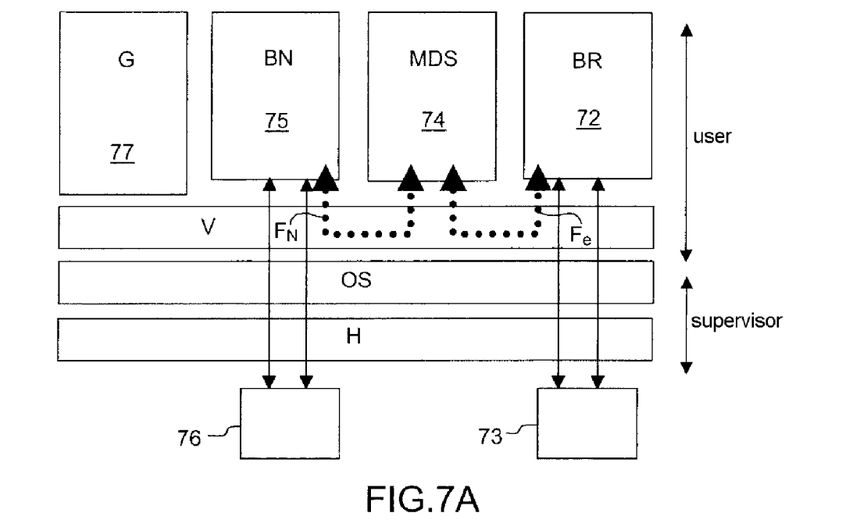
Figure 7B:
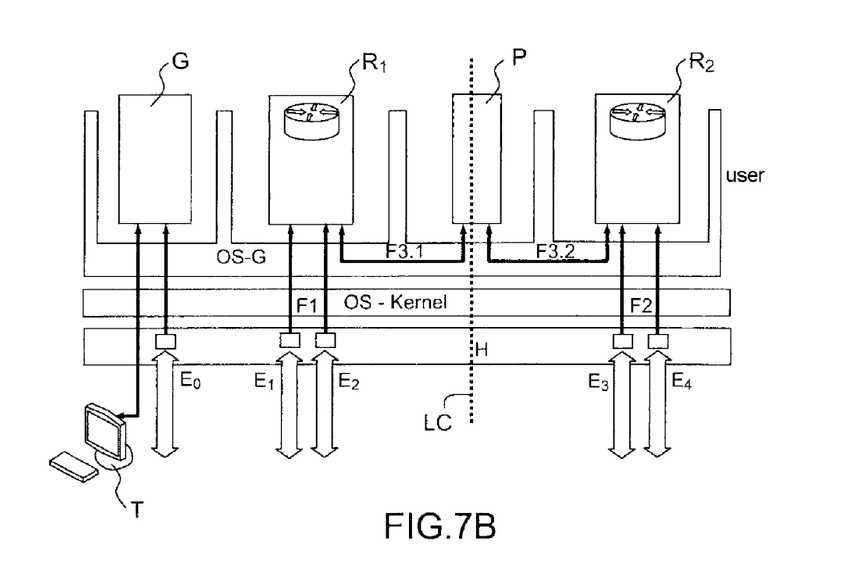

FIGS. 7A and 7B schematically represent two exemplary implementations in a cryptographic apparatus.

In this example, the cryptographic apparatus consists of a user part 70 and a supervisor part 71. The apparatus comprises a physical layer H, a kernel of an operating system, better known as micro kernel. This kernel is itself software, with the notable function of allowing communication between the various elements of the system. A configuration or partition layer C specific to the user. The virtualization technology allows for the creation of the following logical compartments:

a red compartment 72 processes the uncoded, unencrypted data. These user data must be protected, for example for confidentiality and integrity. The red compartment communicates with the outside via 2 Ethernet ports 73 and the hardware and partitioning layers and the micro kernel, a security module (MDS) or cryptographic airlock 74. This so-called trust or security compartment notably handles all the processing operations, the most sensitive ones such as software signing, encryption or even filtering, required when transferring information between a red compartment and a black compartment, a black compartment 75 for the black data, that is to say the encrypted data. This black compartment is connected to the outside world via 2 ports 76, Ethernet for example, and the hardware and partitioning layers and the micro kernel, an administration compartment 77 whose functions are notably software maintenance and updating functions, functions for remotely transferring supervision, for searching for operating bugs, or "debugging", human-machine interface or "HMI" functions for displaying certain partial results or operating states of the apparatus. Its use is not limitative. Its isolation in a specific compartment by means of the underlying technology is justified by the trust level required in the execution of the administration functions. Furthermore, this compartment does not perform any processing on the data flow (the traffic) between the domain A and the domain B.

Each compartment is independent of the others, because of the presence of the virtualization layer in the case of FIG. 7A, the virtualization layer v is represented by the layers of the partitioning manager and the hypervisor which allocates the hardware resource allocations. In other words, a compartment may have its own operating system, be capable of rebooting without disturbing the other compartments, have its own processing operations and its own applications. The virtualization technology implements all the mechanisms required to ensure this independence, even to enable two compartments to exchange information securely. Thus, the exchanges between red and black compartments mandatorily pass through the MDS compartment, these exchanges being schematically represented by the arrows $F_R$ and $F_N$.

FIG. 7B represents a real example of implementation of the architecture of an apparatus designed according to the invention. This figure shows the Ethernet ports corresponding to the interfaces E1, E2, E3, E4 and E5. These interfaces are connected to a so-called "hardware" entity forming the accommodating hardware platform of COTS type, or of dedicated card type. The software elements of the virtualization technology are present through the two entities of "micro-kernel" type, OS-kernel, and of partition management type, or OS-G, better known as "partition manager". This set offers a compartmentalized operating system service for different applications represented via:

the router or network card $R_1$ and its two interfaces $E_1$ and $E_2$ conforming to the previous diagram, the flow of type $F_1$ then circulating between the interfaces $E_1$ and $E_2$;

the router $R_2$ or network card and its two interfaces $E_3$ and $E_4$ conforming to the diagram of FIG. 8B;

the gateway compartment P, responsible for the flow $F_3$ through the two half-connections of type F3.1, $F_N$ (FIG. 7A) and F3.2 or $F_R$ (FIG. 7A);

the management G which implements the terminal T associated with its interface E0. On the one hand, the time sequencing properties of the virtualization technology make it possible to prioritize one compartment over another according to the system objectives to be achieved, on the other hand, the memory isolation provided by the static partitioning implemented in the engineering phases and managed by the partition manager makes it possible to obtain an interconnection of areas of different sensitivities (domain A and domain B in FIG. 9). This interconnection is under the exclusive control of the software of the gateway P, which implements a defined security policy. The capacity to implement a software gateway exclusively on the low level interface of the partition manager, or rather through an operating system OS of Linux or other type no longer depends only on the objectives associated with the certification strategy of the gateway and of the associated virtualization technology.

The two FIGS. 7A and 7B show the transfers via the virtualization layer and the number of switchovers. Two types of flow are thus distinguished:
  the flows that link the network blocks and the outside of the apparatus (communication/inter-apparatus flow),
  the flows that link the network blocks and the security modules MDS (intra-apparatus flow).

The partitioning line LC is represented in order to show that no communication is possible between the two domains A and B outside of the exchanges authorized in the security module MDS (or gateway/airlock).

Figure 8:
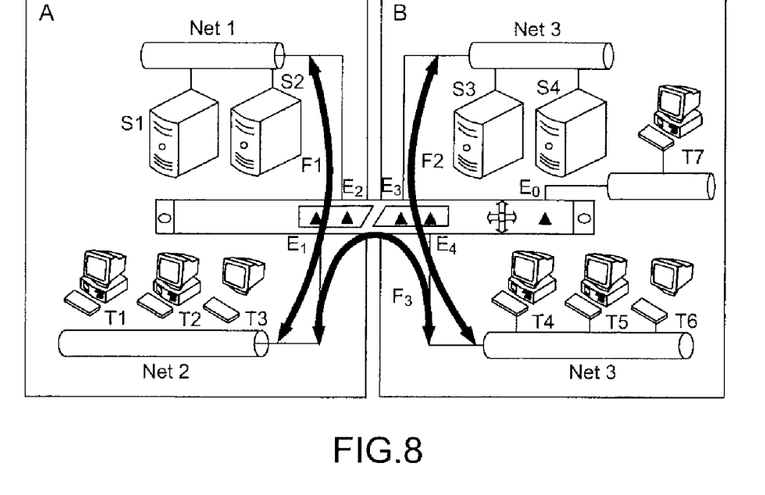

FIG. 8 shows a security apparatus according to the invention through a gateway apparatus with a partitioned operating system comprising a virtualization layer as described in the preceding figures, which corresponds to a software router containing 5 physical interfaces denoted E1, E2, E3, E4 and E5.

The areas "area A" and "area B" correspond to independent local area networks consisting of the servers S1, S2 on the network NET1 in the area A and S3, S4 in the network NET3 in the area B.

Each duly constituted area corresponds to a conventional network architecture that makes it possible to set up information flows of type F1, F2. These flows therefore correspond to the traffic associated with the protocols exchanged between the terminals and the servers. In the absence of flow F3, the duly constituted networks are totally isolated and, in such a case, the router with operating system part could consist of two independent apparatuses of conventional router type. The terminal T on a dedicated interface E0 represents the administration capability of the apparatus. In the proposed diagram, the flow F3 forms part of an item of the invention, it is characterized, for example, by two software and hardware diodes (F3.1 and F3.2 not represented in the figure in the interests of simplification) therefore implementing a one-way traffic. The purpose of these diodes is to prevent traffic from the area A being able to transit toward the area B.

This diagram gives an example of connectivity of an apparatus which incorporates a virtualized security architecture.

FIG. 9A represents an embodiment implementing a self-checking mechanism for the security system. In order to check the guarantee of execution of the security function implemented in an airlock arranged to intersect a red block 81 and a black block, it is possible to put in place a self-checking mechanism which consists in applying the security function, or an encryption function $S_1$, or decryption function $S_{-1}$ to the message or data to which the same function was applied in a preceding step.

Thus, in the figure, in the case where the aim is to transmit data from the domain A to the domain B of lower security level than that of A. The data will first be transmitted to the red block 81 via the hardware and virtualization layer 82 before passing first into the first encryption airlock 83 then into the second decryption airlock 84. The encrypted then decrypted data flow is then transmitted to a control and testing module 85 designed to check that the decrypted data is in fact identical to the initial data to be encrypted. The control may consist of an analysis and a comparison of the decrypted code. Thus, this test guarantees that the data flow which leaves the domain A is indeed protected in the domain B after passage into the black block 86 and the block 83.

Figure 9B:
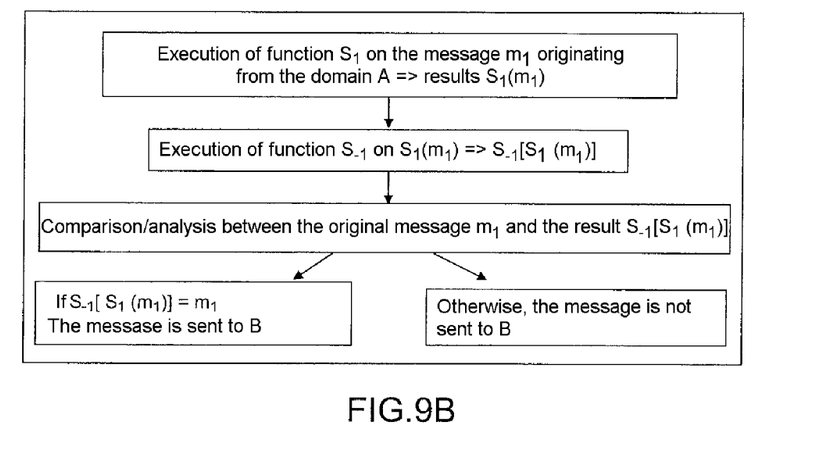

The FIG. 9B mechanism schematically represents the steps of the flow diagram of FIG. 9A. FIG. 9A, with its mechanism described in 9B, shows a system which guarantees that the flows are correctly protected (in this case encrypted) before going into a WAN (public domain/black domain). Other control, testing or self-testing systems may enhance the security or dependability of the security apparatus.

Figure 10:
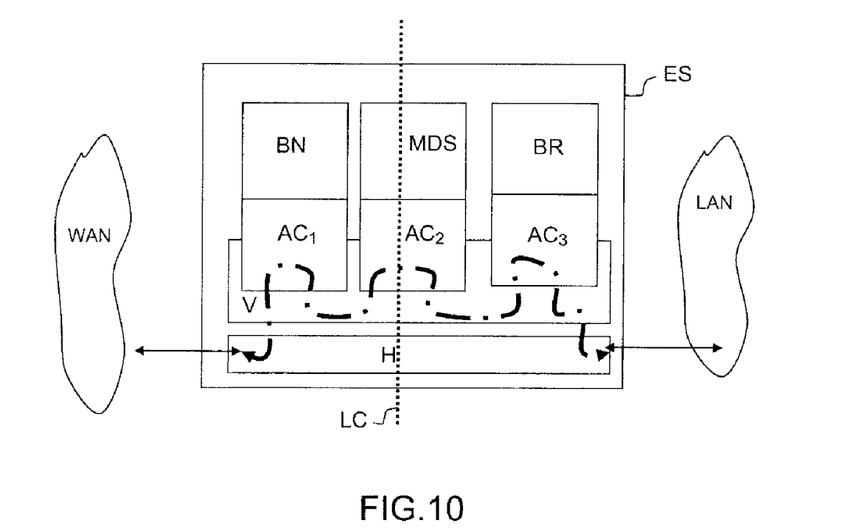
Figure 11:
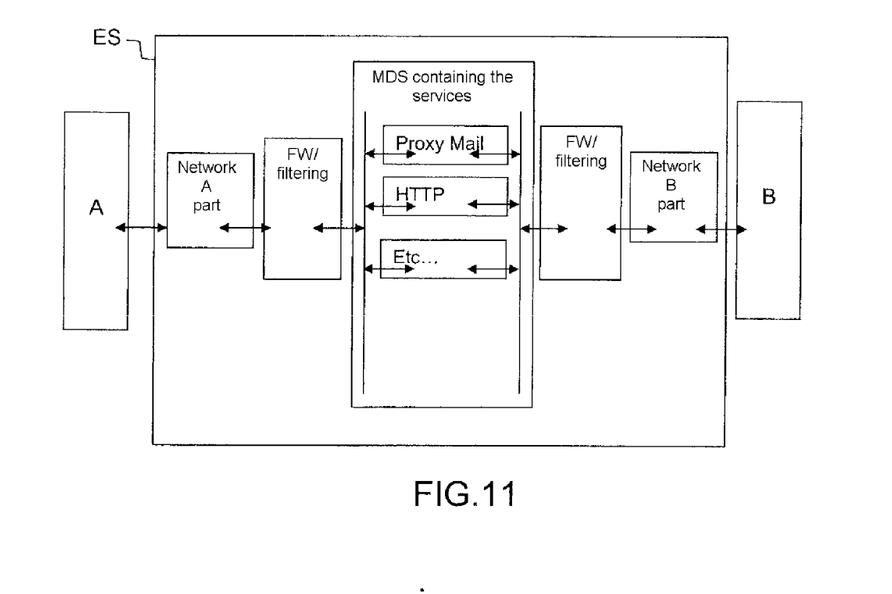
Figure 12:
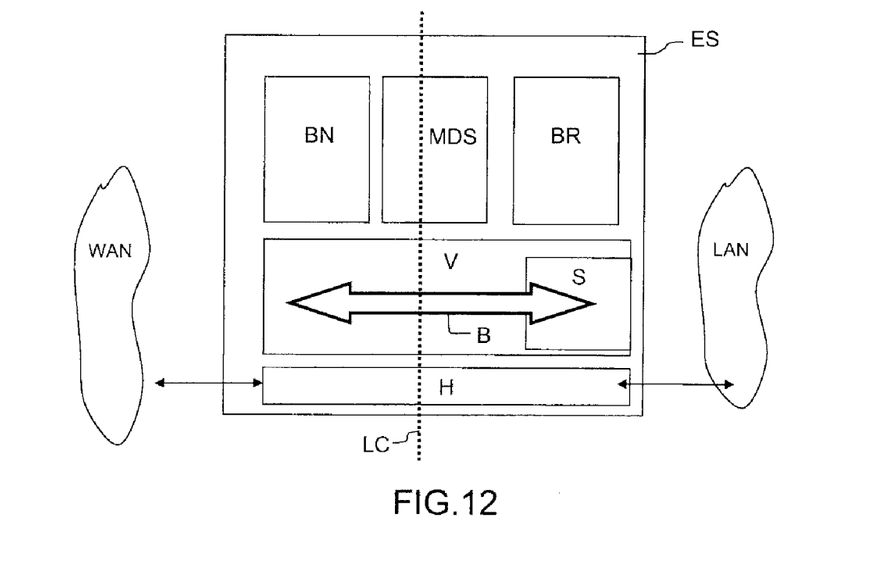

Other control mechanisms may be implemented as in FIGS. 10, 11 and 12. FIGS. 10, 11 and 12 represent a space-time segregation mechanism for the flows of different sensitivity levels. It is important to implement mechanisms which guarantee that the information contained in the virtualized ES will never be mixed both in space and in time while ensuring that the configuration of the virtualization tool is correctly implemented. This is an essential property on which the invention relies. Putting such a property in place relies on 1) specific hardware mechanisms (memory access controller, pagination/segmentation, centralized interrupt management, etc.) and, 2) appropriate software mechanisms. The operation of these mechanisms known to those skilled in the art is not described in the invention. In other words, this imposes two types of protection which complement one another:
  a spatial protection: FIG. 10. Controllers (or in this example, control state machines ACi: such as firewall or software filter) are at the input of each block BR, MDS and check each frame of the incoming or outgoing flows (by means of tags or labels contained in the frames). These checkers are for example:
  memory control modules: the memories must not be shared (partition, different memory, different ranges, etc.),
  processor core modules (in the case of a multi-core processor) allocated to a certain security level. A processor core may be allocated to a block,
  a spatial security protection: in this example, the MDS may contain all the security functions or else the security apparatus may include an MDS for each service (for example: FIG. 11).
  a temporal protection: FIG. 12
  it uses a sequencer S/timer which prevents one and the same shared bus B or a CPU from working both on red or black data. The timer allocates time divisions to each compartment in order that no flow is mixed with another of a security level other than its own,
  it makes it possible to avoid the creation of hidden time channels and the operation of auxiliary channels relying on a measurement of processing time or of the availability rate of a resource,
  a configuration protection.

The control state machines filter all the incoming or outgoing flows of each of the blocks/compartments.

In FIG. 12, the sequencer allocates a CPU or access time to the internal bus for data exchanges.

FIG. 11 schematically represents an exemplary application of the security apparatus for a gateway. In this example, the virtualization and more particularly the filtering blocks make it possible to distinguish the flows from one another: spatial segregation. The latter also make it possible to have a temporal segregation which can be implemented differently depending on the security and network constraints. The security apparatus is positioned between a domain A of security level A and a domain B of security or sensitivity level B. The flows from A pass via a network block A toward a filtering module FWA. At the output of the filtering module, the data are transmitted to the MDS which contains the various services. The filtering blocks FWx are then used to switch flows to the desired services. There may be as many compartments as there are services. There may also be service groupings within a single compartment. Then, the data are transmitted to a second filtering module FWB before being sent into a part B of the network and toward the domain B.

FIG. 12 more particularly illustrates the virtualization layer, with the sequencer S and the exchange bus B.

Figure 13:
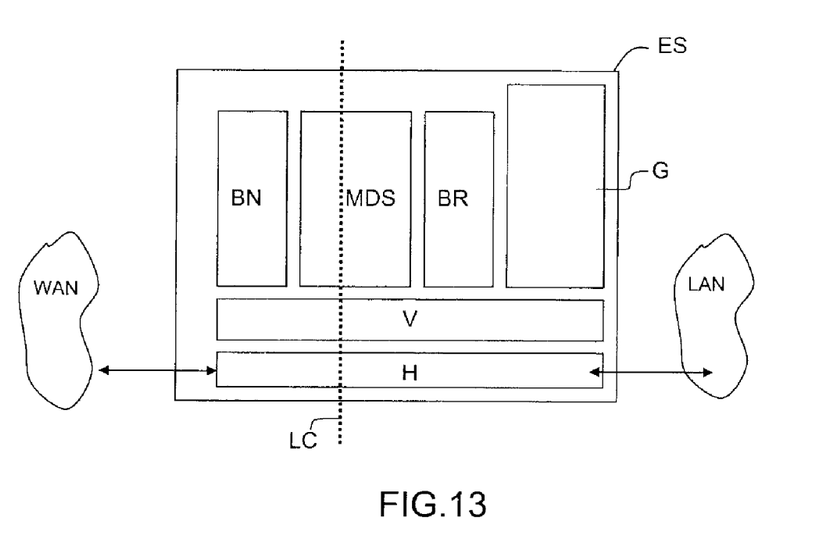

FIG. 13 shows that an additional compartment can be added in order to offer administration services G for the security apparatus (such as HMI, remotely transferred supervision in order for the operator or network administrator to be able to check the correct operation of the apparatus, etc.).

Figure 14:
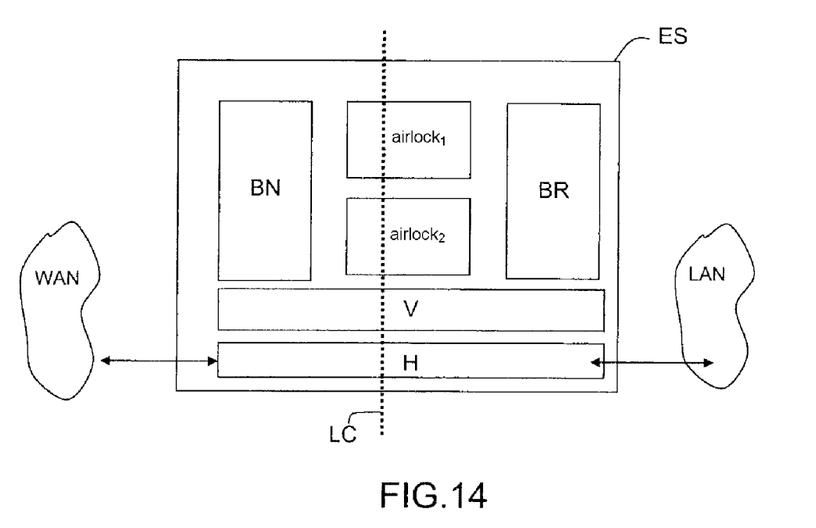

FIG. 14 shows a virtualized security apparatus which has an additional compartment for increasing reliability and consequently operational security for the security transformation (figure similar to FIG. 9A). In the two airlocks MDS1, MDS2, segregating the red block and the black block BR, BN, the same programs or security processing are executed with a slight offset in time: thus, once the processing operations are completed, the results are compared. When the results are the same, the flows (for example encrypted) leave the apparatus; if it is not the same then it does not leave the apparatus. Thus, if they are subjected to an attack or an intrusion at a given instant, the two processes are not disturbed in the same way because they do not execute the same processing operation at an instant t because of the small time offset.

Figure 15:
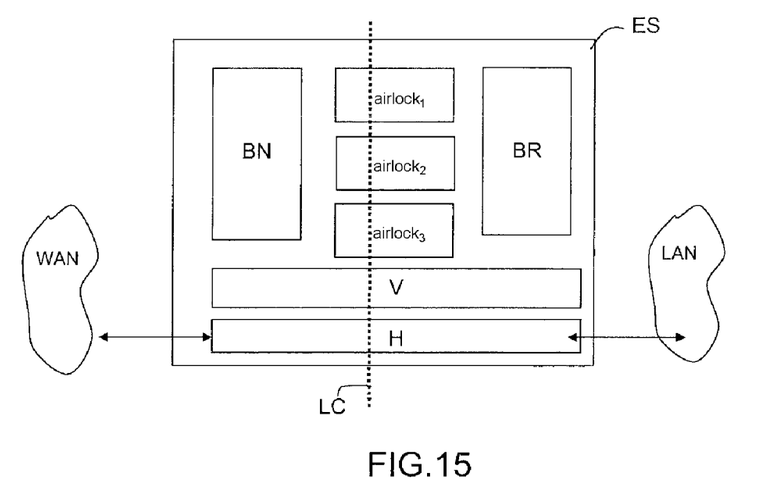

Similar mechanisms illustrated in FIG. 15 can be used with three airlocks (or MDS), airlock 1, airlock 2, airlock 3, segregating the red block BR and the black block BN which execute the same processing operations but a majority vote is performed at the end of them: if at least two results are identical then the processing operation has been successful, otherwise it has failed and the apparatus is frozen (it blocks any communication after having sent an alarm to its management or supervision center).

The invention claimed is:

1. A security apparatus ES arranged to be positioned between at least a first domain having a first security level A and at least a second domain having a second security level B, wherein the first security level A is different from the second security level B, the security apparatus comprising:
a physical layer H and interfaces I configured to enable the exchange of data between said security apparatus ES and the first and second domains;
a virtualization layer V implemented on the physical layer H; and
at least one set of at least three compartmentalized blocks, BLA, BLB, MDS, said compartmentalized blocks implemented on the virtualization layer V, and said compartmentalized blocks comprising:
a first software block, BLA, configured to perform the network functions used to process data of first security level A,
a second software block, BLB, configured to perform the network functions used to process data of second security level B, and
a security module software block, MDS, positioned between the first software block BLA and the second software block BLB, said security module software block MDS configured to monitor exchanges of data between said first software block BLA and said second software block BLB, and said security module software block MDS configured to perform security, filtering, or cryptographic functions.

2. The security apparatus according to claim 1, wherein the security apparatus ES is configured to perform functions for managing the exchanges of the data between the first software block BLA, the second software block BLB, and the security module software block MDS by managing the exchanges of data between:
the first domain and the first software block BLA,
the first software block BLA and the security module software block MDS,
the security module software block MDS and the second software block BLB, and
the second software block BLB and the second domain.

3. The security apparatus according to claim 1, wherein each of the first domain and the second domain is linked to a network or a subnetwork, and wherein the first software block BLA is a first network block BRA and the second software block BLB is a second network block BRB.

4. The security apparatus according to claim 1, wherein the security module software block MDS comprises an IP encryptor and/or a firewall and/or a diode and/or an intrusion detector and/or a flow analyzer.

5. The security apparatus according to claim 1, further comprising:
a first number of first software blocks BLA, the first number of security module software blocks MDS, and a second number of second software blocks BLB, wherein the first number is different from the second number.

6. The security apparatus according to claim 1, wherein the security module software block MDS is positioned in the security apparatus ES such that uncoded sensitive data from the second domain is transmitted through the physical layer H and the virtualization layer V to the second software block BLB, then to the security module software block MDS to be encrypted, and then to the first software block BLA before being transmitted to the first domain.

7. The security apparatus according to claim 1, further comprising:
an administrator module G.

8. The security apparatus according to claim 1, wherein the number of security module software blocks MDS is equal to the number of security levels or to the number of software blocks configured to perform network functions used to process data of different security levels in said security apparatus ES.

9. The security apparatus according to claim 8, wherein the number of security levels is equal to the number of the software blocks configured to perform network functions used to process data of the different security levels.

10. The security apparatus according to claim 6, wherein the security module software block MDS is positioned in the security apparatus ES such that encrypted sensitive data from the first domain is transmitted through the physical layer H and the virtualization layer V to the first software block BLA, then to the security module software block MDS to be decrypted, and then to the second software block BLB before being transmitted to the second domain.

* * * * *